United States Patent
Sharifi et al.

(10) Patent No.: US 9,704,483 B2
(45) Date of Patent: Jul. 11, 2017

(54) COLLABORATIVE LANGUAGE MODEL BIASING

(71) Applicant: Google Inc., Mountain View, CA (US)

(72) Inventors: Matthew Sharifi, Kilchberg (CH); Jakob Nicolaus Foerster, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/811,190

(22) Filed: Jul. 28, 2015

(65) Prior Publication Data

US 2017/0032781 A1   Feb. 2, 2017

(51) Int. Cl.
*G06F 17/27* (2006.01)
*G10L 15/197* (2013.01)
*G10L 15/22* (2006.01)

(52) U.S. Cl.
CPC .......... *G10L 15/197* (2013.01); *G06F 17/277* (2013.01); *G06F 17/2785* (2013.01); *G10L 2015/227* (2013.01)

(58) Field of Classification Search
CPC ........ G06F 17/277; G06F 17/21; G06F 17/27; G06F 17/276; G06F 17/2785; G06F 17/28; G06F 17/289; G06F 17/30011; G06F 17/30864; G10L 15/183; G10L 15/30; G10L 15/005; G10L 15/18; G10L 15/197; G10L 15/22; G10L 15/26; G10L 15/265; G10L 2015/223
USPC ...... 704/9, 10, 235, 243, 239, 257, 231, 245
See application file for complete search history.

(56) References Cited

U.S. PATENT DOCUMENTS

| | | | |
|---|---|---|---|
| 6,618,722 B1* | 9/2003 | Johnson | G06F 17/30672 707/999.003 |
| 8,521,526 B1 | 8/2013 | Lloyd et al. | |
| 2004/0186714 A1 | 9/2004 | Baker | |
| 2007/0214131 A1* | 9/2007 | Cucerzan | G06F 17/30864 707/999.005 |
| 2008/0015864 A1* | 1/2008 | Ross | G10L 15/1822 704/275 |
| 2009/0030688 A1* | 1/2009 | Cerra | G10L 15/30 704/243 |
| 2009/0186714 A1* | 7/2009 | Van Buren | A63D 15/10 473/42 |
| 2009/0249198 A1* | 10/2009 | Davis | G06F 17/276 715/261 |
| 2011/0153324 A1* | 6/2011 | Ballinger | G10L 15/30 704/235 |
| 2012/0016678 A1* | 1/2012 | Gruber | G06F 17/3087 704/275 |

(Continued)

*Primary Examiner* — Vijay B Chawan
(74) *Attorney, Agent, or Firm* — Fish & Richardson P.C.

(57) ABSTRACT

Methods, including computer programs encoded on a computer storage medium, for collaborative language model biasing. In one aspect, a method includes receiving (i) data including a set of terms associated with a target user, and, (ii) from each of multiple other users, data including a set of terms associated with the other user, selecting a particular other user based at least on comparing the set of terms associated with the target user to the sets of terms associated with the other users, selecting one or more terms from the set of terms that is associated with the particular other user, obtaining, based on the selected terms that are associated with the particular other user, a biased language model, and providing the biased language model to an automated speech recognizer.

19 Claims, 6 Drawing Sheets

(56) References Cited

U.S. PATENT DOCUMENTS

2012/0022866 A1 1/2012 Ballinger et al.
2012/0254333 A1* 10/2012 Chandramouli ........ G06F 17/27
                                                  709/206
2012/0323828 A1* 12/2012 Sontag .............. G06F 17/30011
                                                  706/12

* cited by examiner

TARGET USER

| TERM | RECOGNITION SCORE | CLASSIFICATION |
|---|---|---|
| ABRAHAM ABRAHAM | 0(+), 0(-) | N-gram |
| . . . | | |
| ROGER FEDERAL | 0(+), 27(-) | N-gram |
| . . . | | |
| ROGER FEDERER | 27(+), 0(-) | N-gram |
| . . . | | |
| ROGER FEDERER | 54(+), 0(-) | Entity |
| . . . | | |
| ZZYZX ZZYZX | 0(+), 0(-) | N-gram |

FIG. 3

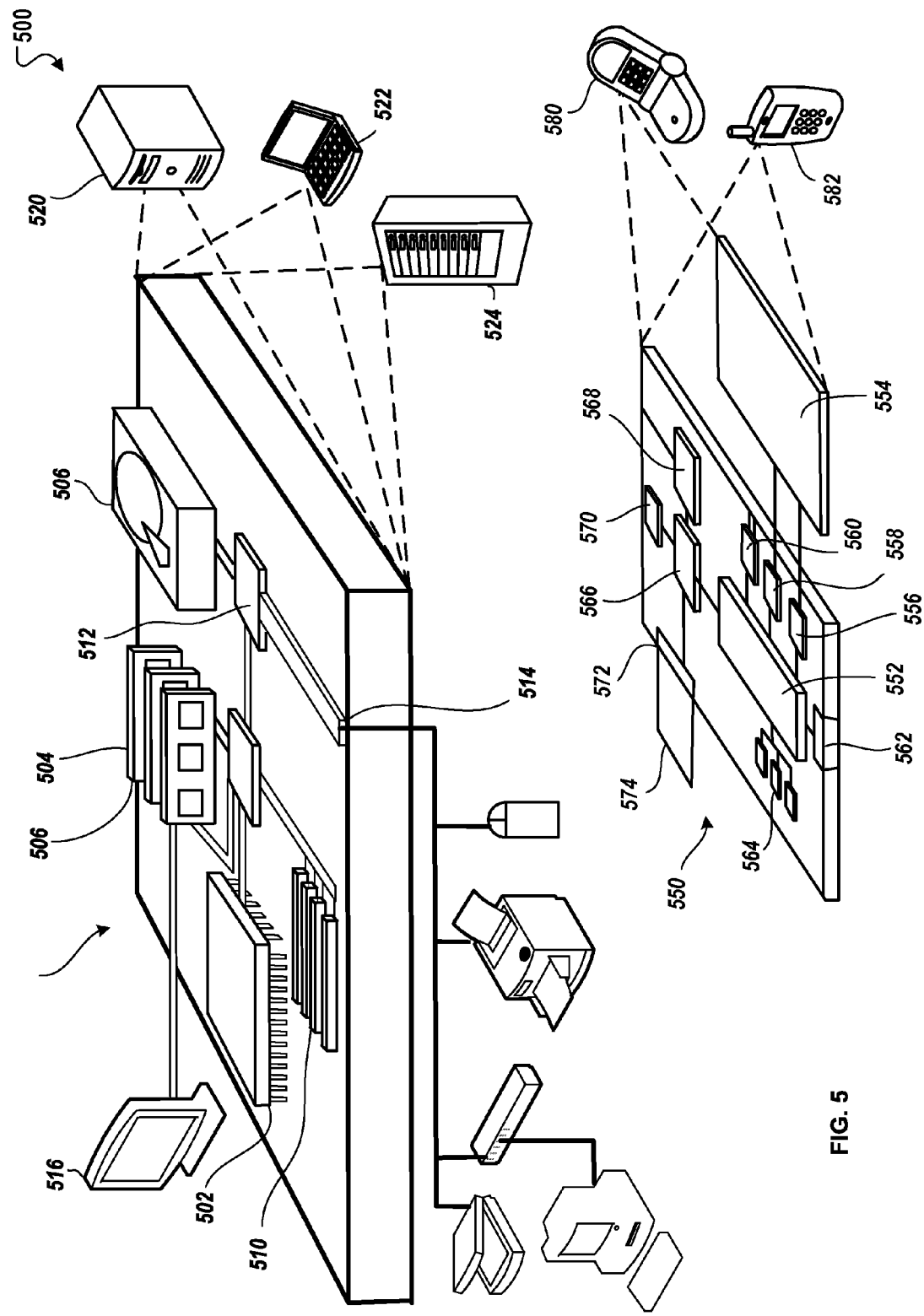

COLLABORATIVE LANGUAGE MODEL BIASING

FIELD

The present specification relates to automated speech recognition.

BACKGROUND

Language models, which are components of systems such as automated speech recognizers (ASR) assign probabilities to sequences of speech or text, known as n-grams. ASR transcribe utterances into a series of computer readable sounds, which are then compared to a dictionary of words in a given language. The probabilities can be used to help select the most likely transcription of an utterance.

SUMMARY

In general, one innovative aspect of the subject matter described in this specification can be embodied in methods that perform context-based collaborative language model biasing without requiring explicit rules or user behavior modeling. For instance, collaborative filtering and clustering techniques may be used to bias n-grams or entire utterances in order to determine n-grams that a target user is likely to say in a subsequent voice query based on user data including previous voice queries in relation to collective behaviors of other users that are identified as being similar to the target user.

Collaborative language model biasing is performed using two approaches to identify probable n-gram sequences associated with a target user. The first approach utilizes a user-to-user similarity determination to identify shared n-gram sequences between similar users. The second approach utilizes term clusters to build cross-user generalization models to identify n-grams related to particular topics.

Implementations may include one or more of the following features. For example, receiving (i) data including a set of terms associated with a target user, and, (ii) from each of multiple other users, data including a set of terms associated with the other user; selecting a particular other user based at least on comparing the set of terms associated with the target user to the sets of terms associated with the other users; selecting one or more terms from the set of terms that is associated with the particular other user; obtaining, based on the selected terms that are associated with the particular other user, a biased language model; and providing the biased language model to an automated speech recognizer.

In some implementations, a computer-implemented method may include: receiving (i) data including a set of terms associated with a target user, and, (ii) from each of multiple other users, data including a set of terms associated with the other user; selecting a particular term from the set of terms associated with the target user; identifying a particular other term, from among the sets of terms that are associated with the multiple other users, that is indicated as related to the particular term; obtaining, based on the particular other term, from among the sets of terms that are associated with the multiple other users, that is indicated as related to the particular term, a biased language model; and providing the biased language model to an automated speech recognizer.

In some implementations, a computer-implemented method may include: receiving (i) data including a set of terms associated with a target user, and, (ii) from each of multiple other users, data including a set of terms associated with the other user; selecting a particular term from the set of terms associated with the target user; identifying an identifier of a cluster of related terms that (i) includes the particular term from the set of terms that are associated with the target user, and (ii) includes one or more terms that are associated with the multiple other users; selecting a particular other user based at least on comparing the identifier of the cluster of related terms to one or more cluster identifiers associated with the multiple other users; selecting one or more terms from the set terms that is associated with the particular other user; obtaining, based on the selected terms that are associated with the particular other user, a biased language model; and providing the biased language model to an automated speech recognizer.

Other versions include corresponding systems, and computer programs, configured to perform the actions of the methods encoded on computer storage devices.

One or more implementations may include the following optional features. For example, in some implementations, selecting a particular other user based at least on comparing the set of terms associated with the target user to the sets of terms associated with the other users includes selecting multiple particular other users based at least on comparing the set of terms associated with the target user to the sets of terms associated with the multiple other particular users.

In some implementations, selecting a particular term from the set of terms associated with the target user includes selecting multiple particular terms from the set of terms associated with the target user.

In some implementations, identifying the particular other term that is indicated as related to the particular term includes identifying the particular other term that is indicated as related to the multiple particular terms.

In some implementations, the particular other user is a user that is identified as similar to the target user.

In some implementations, obtaining the biased language model includes adjusting a respective score associated with each of the selected terms in a baseline language model.

In some implementations, the set of terms associated with a target user includes terms from one or more queries that were previously submitted by the target user.

In some implementation, for each user, the set of terms associated with the user includes terms that are indicated as terms that have been accepted by the user.

In some implementations, for each term of the set of terms, the data indicates whether the term includes an n-gram or an entity name.

In some implementations, the set of terms associated with a target user includes transcriptions of prior utterances by the target user.

In some implementations where the set of terms associated with a target user includes transcriptions of prior utterances by the target user, the method includes: receiving an utterance from the target user and transcribing the utterance using the biased language model.

In some implementations, identifying the particular other term that is indicated as related to the particular term includes: identifying an identifier of a cluster of related terms that (i) includes the particular term from the set of terms that are associated with the target user, and (ii) includes one or more terms that are associated with the multiple other users; and identifying, based at least on comparing the identifier of the cluster of related terms to one or more cluster identifiers associated with the multiple other users, a particular other that is indicated as related to the particular term.

In some implementations, the set of terms that is associated with the particular other user is part of the cluster of related terms that (i) includes the particular term from the set of terms that are associated with the target user, and (ii) includes one or more terms that are associated with the multiple particular other users.

In some implementations, selecting one or more terms from the set terms that is associated with the particular other user includes selecting one or more terms, from among the set of terms that is associated with the particular other user, that are identified as being rejected by the particular other user.

In some implementations, obtaining the biased language model includes obtaining, based on the selected terms that are identified as being rejected by the particular other user, a biased language model that is biased away from the selected terms that are identified as being rejected by the particular other user.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

FIG. 3 illustrates an exemplary term vector used for language model biasing.

FIG. 5 is a block diagram of computing devices on which the processes described herein, or potions thereof, may be implemented.

In the drawings, like reference numbers represent corresponding parts throughout.

DETAILED DESCRIPTION

Figure 1:
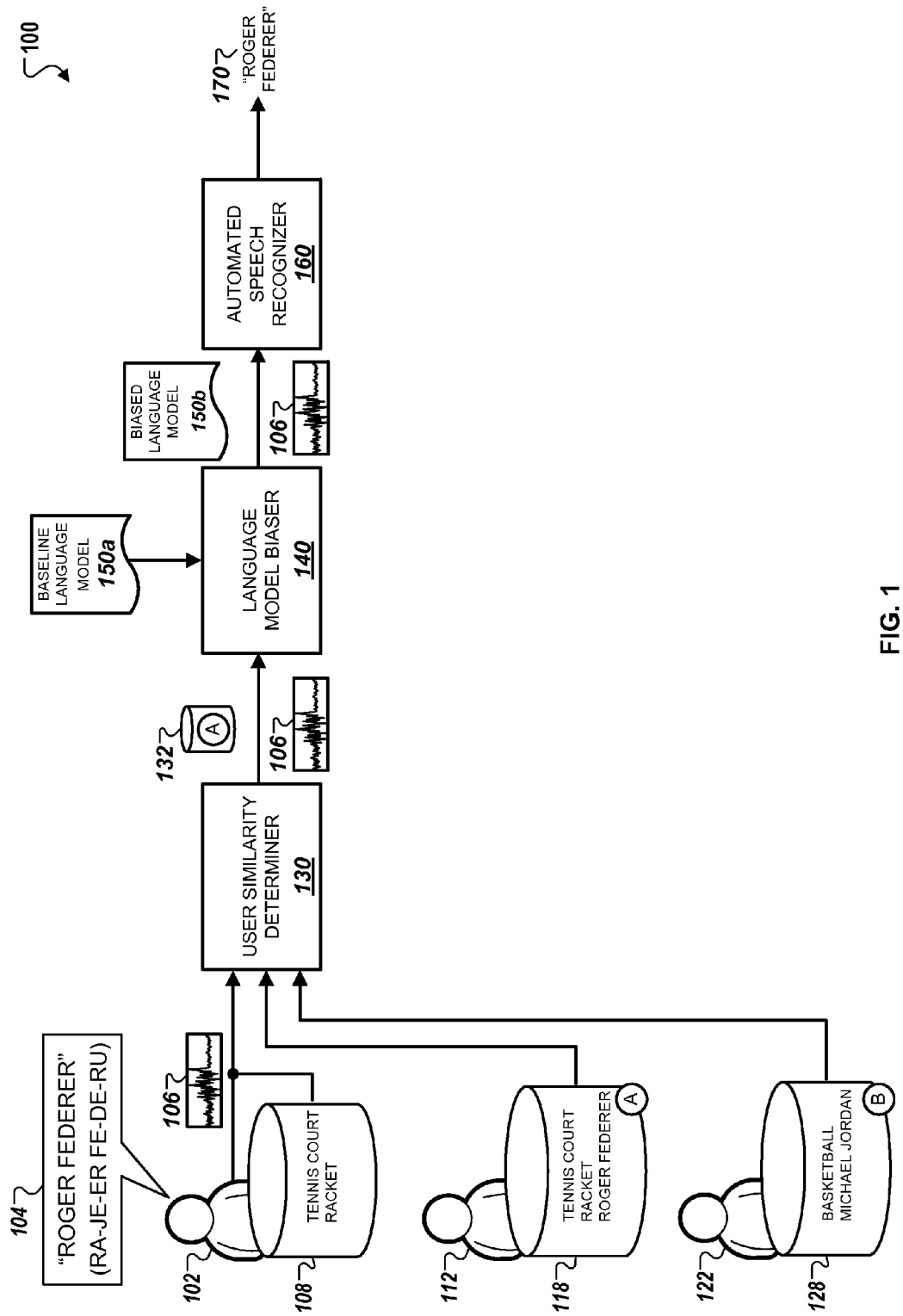
FIG. 1 illustrates an exemplary system that may be used for collaborative language model biasing based on user similarity.

Automated speech recognition of entity terms that include proper nouns, names of places, individuals, or common nouns is challenging. For instance, accurate transcriptions of entity terms are difficult since a particular sequence may map to various words or n-grams. In such instances, a language model within the ASR may be configured to allow for errors or inaccuracies in phoneme labels of particular sequences.

User context is important to improving the transcription accuracy for entity terms. For instance, context data such as user location may be used to recognize nearby entities such as restaurants or other points of interest. For example, a context-enhanced language model may be used by the ASR to accurately transcribe voice queries that include names of these points of interest. User location may also be combined with user profiles that indicate user activity. For instance, user location and user activity data may be used determine user preferences, which then may be used to bias a language model. For example, if user activity data indicates that a user likes Italian cuisine or horror movies, these preferences may be considered by the ASR when outputting particular terms within the language model that likely represent contexts associated with user preferences.

Although using context data in language model biasing may improve recognition performance of ASR, individual characteristics associated with single users are difficult to capture with such a general rule-based system. In addition, such rule-based systems are often entity-based, which makes them inflexible and unable to bias towards recognition of non-entity words or phrases.

Collaborative language model biasing is performed using two approaches to identify probable n-gram sequences associated with a target user. The first approach utilizes a user-to-user similarity determination to identify shared n-gram sequences between similar users. The second approach utilizes term clusters to build cross-user generalization models to identify n-grams related to particular topics.

With respect to the first approach, user similarity may be used to predict probable n-grams that a target user is likely to use in subsequent voice queries given the query histories of the target user and other users identified as being similar to the target user. The initial step is to identify similar users using query histories to match users that have provided similar n-grams over a particular time period. Once the similar users have been identified, n-grams and terms that the similar users have used may be positively biased within a language model to increase the likelihood of generating a candidate recognition hypothesis for a subsequent utterance by the target user that includes the shared n-grams. Similarly, n-grams that the target user or the similar users have rejected, determined based on, for example, user activity indicating repeated voice queries and abandoning a search results page, may be negatively biased to decrease the likelihood of generating a recognition hypothesis that includes these n-grams. Alternatively, in some implementations, dissimilar users may be identified and then the terms that are not shared between the target user and the dissimilar users may be negatively biased.

In instances where user similarity is used to identify shared n-grams, there may be no need to explicitly capture attributes associated to the target user such as the user location. For example, two users that are interested in artwork and have previously searched for similar pieces of art may be identified as similar users based on their likelihood to search for similar pieces of art in subsequent search queries. In this example, the two users are determined to be similar independent of their user locations because their prior search queries indicate common interests.

With respect to the second approach, dimensionality reduction techniques may be used to build cross-user generalization models. For instance, n-gram matrices for users may be calculated using a standard non-negative matrix factorization technique that includes cluster probability. Decomposition of the n-gram matrices results in a low dimensional approximation of the n-gram probabilities for a particular other user by using particular n-gram clusters. For example, if a first user has previously searched for a set of unigrams including "goal, football, score, winning, fishing, rod, water, lake," and a second user has previously searched for a set of unigrams including "goal, referee, losing, car, accident," then the algorithm will cluster "football" related terms across different users and ensure that a particular other user that has used a portion of these terms can access all of the football-related terms in subsequent voice queries.

FIG. 1 is a diagram that illustrates an exemplary system 100 for language model biasing based on user similarity. Briefly, the system 100 may be used to determine a user similarity between a target user 102 and other users 112 and 122 based on a voice query 104 provided by the target user 102 and term repositories 108, 118, and 128 that are associated with the target user 102, the other user 112, and the other user 122, respectively. The system 100 may include a user similarity determiner 130, a language model biaser 140, a language model 150, and an automated speech recognizer (ASR) 160.

In more detail, the target user 102 may initially provide a voice query 104 to a mobile device such as, for example, a smartphone, a tablet computer, a laptop computer, or any other type of mobile computing device. The voice query 104 may include various types of voice-enabled input such as voice searches, voice commands, or dictation that are recognized and processed by ASR 160 using common speech recognition techniques.

The voice query 104 may initially be encoded as the audio data 106, which may be transmitted to the user similarity determiner 130. As represented in the example in FIG. 1, the target user 102 may submit a voice query 104 that includes "ROGER FEDER," which may be phonetically transcribed as "RA-JE-ER FE-DE-RU" based on the characteristics of the audio data 106.

The user similarity determiner 130 may receive a set of terms associated with the target user 102 from the term repository 108, which may include one or more terms from previously submitted voice queries of the target user 102. For example, as shown in FIG. 1, prior to submitting the voice query 104, the target user 102 previously searched "TENNIS COURT" and "RACKET," which are pulled from a user history and stored in the term repository 108.

The user similarity determiner 130 may also receive a set of terms associated with the other multiple other users 112 and 122 from the term repositories 118 and 128, respectively. The multiple other users 112 and 122 may be other users that use the same ASR as the target user 102, or other users that share a particular context such as, for example, a user preference, a common mobile application, or a common voice recognition software platform.

In some instances, the user similarity determiner 130 may filter out particular terms that are identified as common terms or n-grams, which are likely to be included in the set of terms associated with every user. For instance, the user similarity determiner 130 may remove such terms from the set of terms associated with the target user 102 such that they are not used in the comparison between the set of terms associated with the target user 102 and the multiple other users 112 and 122 to determine user similarity.

The user similarity determiner 130 may compare the set of terms associated with the target user 102 and the set of terms associated with the other users 112 and 122. The user similarity determiner 130 may then determine a user similarity based on comparing the terms associated with the target user 102 and the terms associated with the multiple users 112 and 122. For example, as shown in FIG. 1, the user similarity determiner 130 may determine that the target user 102 has a high similarity with the other user 112 based on determining that they share the terms "TENNIS COURT" and "RACKET." Alternatively, the user similarity determiner 130 may also determine that the target user 102 has a low similarity with the other user 122 based on determining that they have no terms in common.

The user similarity determiner 130 may then select one or more terms from the set of terms that is associated with a particular other user that has a high similarity to the target user 102. For example, as shown in FIG. 1, the user similarity determiner 130 may generate the selected terms 132, which includes the terms "TENNIS RACKET," "RACKET," and "ROGER FEDERER" based on determining that the target user 102 has a high user similarity to the other user 122. The user similarity determiner 130 may then transmit the selected terms 132 to the language model biaser 140. In some instances, the selected terms 132 may additionally or alternatively include terms includes in previous search queries by the target user 102.

The language model biaser 140 may bias the baseline language model 150a using the selected terms 132, which are associated with the other user 122. The baseline language model 150a may be a set of assigned probabilities to a sequence of n-grams by using a probability distribution. The baseline language model 270a may also be a unigram model, or a positional language model that describes the possibility of given words occurring close to one another within a text. The language model biaser 140 biases the baseline language model 150a by adjusting probabilities associated with words within the language model that increase the likelihood of being selected to transcribe the user query 104. For example, the language model biaser 140 may bias the baseline language model 150a by increasing the assigned probabilities for n-grams that are associated with the terms "TENNIS RACKET," "RACKET," and "ROGER FEDERER." In such an example, the likelihood that the n-grams associated with these terms are included in a candidate recognition hypothesis for a subsequent voice query is increased. The language model biaser 140 may additionally bias the baseline language model 150a to bias away from misrecognitions from the multiple other users 112 and 122 that are identified as similar users. For instance, the language model biaser may bias the baseline language model to reduce the probability of common misrecognitions of previous queries submitted by the multiple other users 112 and 122.

In some implementations, the user similarity determiner 130 may additionally select one or more terms from the set of terms associated with a particular other user that has a low similarity with the target user 102. For example, the terms "BASKETBALL" and "MICHAEL JORDAN" may be selected and transmitted to the language model biaser 140. In such implementations, the language model biaser 140 may use these terms to negatively bias the baseline language model 150a such that the probability of n-grams associated with these terms is reduced and is less likely to be included in a candidate recognition hypothesis for a subsequent voice query of the target user 102.

The language model biaser 140 may then generate the biased language model 150b, which includes the updated probabilities for n-grams associated with the selected terms 132. The biased language model may then be transmitted to the ASR 160 for transcribing the utterance of the voice query 104 by the target user 104.

The ASR 160 may receive the biased language model 150b and uses it to transcribe the voice query 104 using an acoustic model. The acoustic model identifies a transcription of the voice query 104 provided by the target user 102 into a readable text. The ASR 160 then uses the biased language model 150b to recognize the transcription by the acoustic model and reduce the word error rate in predicting that the transcription is an accurate representation of the voice query 104.

As shown in the example in FIG. 1, the ASR 160 uses the biased language model 150b and the acoustic model to generate a transcription "ROGER FEDERER" for the phonetic transcription "RA-JE-ER FE-DE-RU" of the voice query 104. In this example, although the utterance is ambiguous, the automated speech recognizer accurately transcribes the utterance because the biased language model includes increased probabilities associated with the term "ROGER FEDERER," which was selected from the term repository 118 of the other user 112 by the user similarity determiner 130 based on determining that the target user 102 and the other user 112 are highly similar. Such an example demonstrates how user similarity and user context may be combined and used to collaboratively bias a baseline language model to increase the probability of generating an accurate transcription for an ambiguous utterance.

Figure 2A:
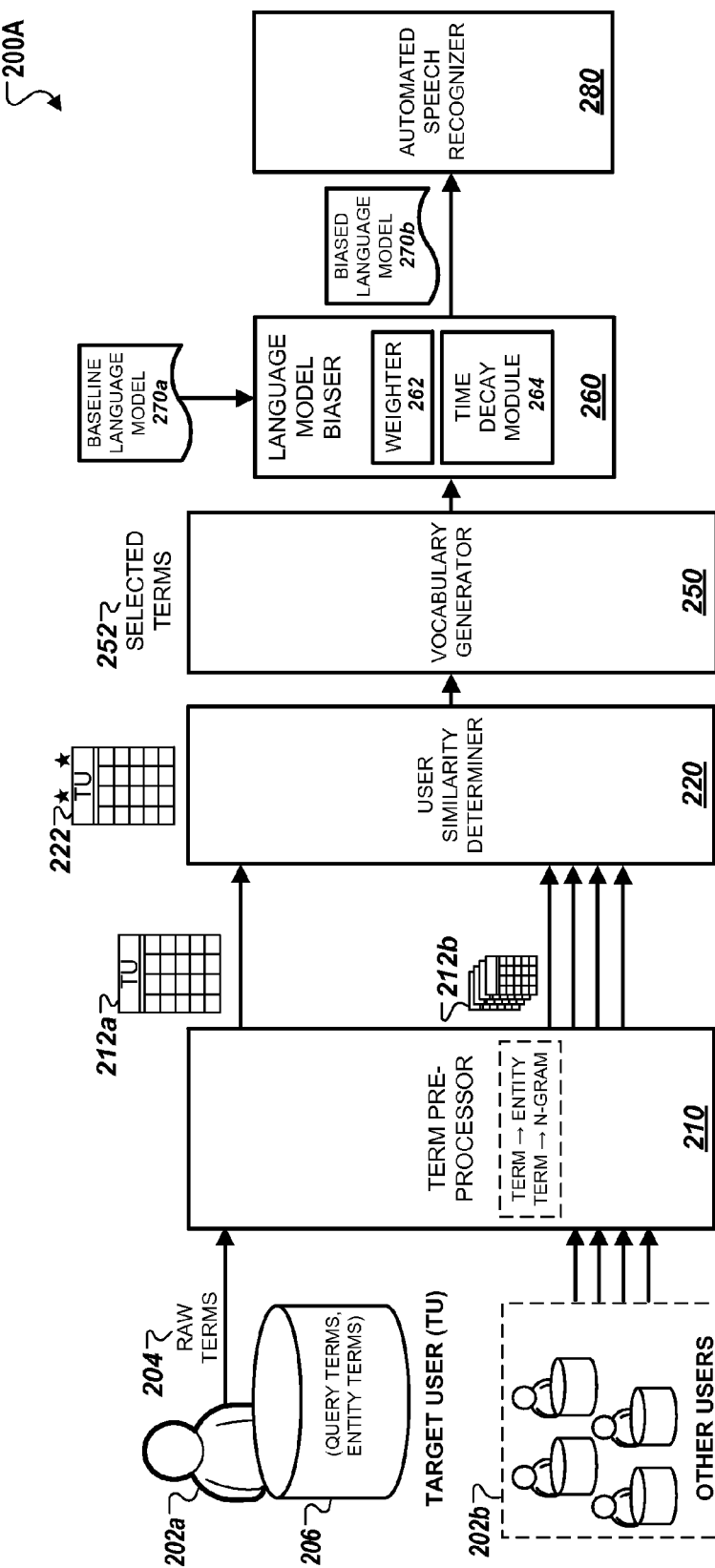
FIGS. 2A-2B illustrate exemplary systems that may be used for collaborative language model biasing.
Figure 2B:
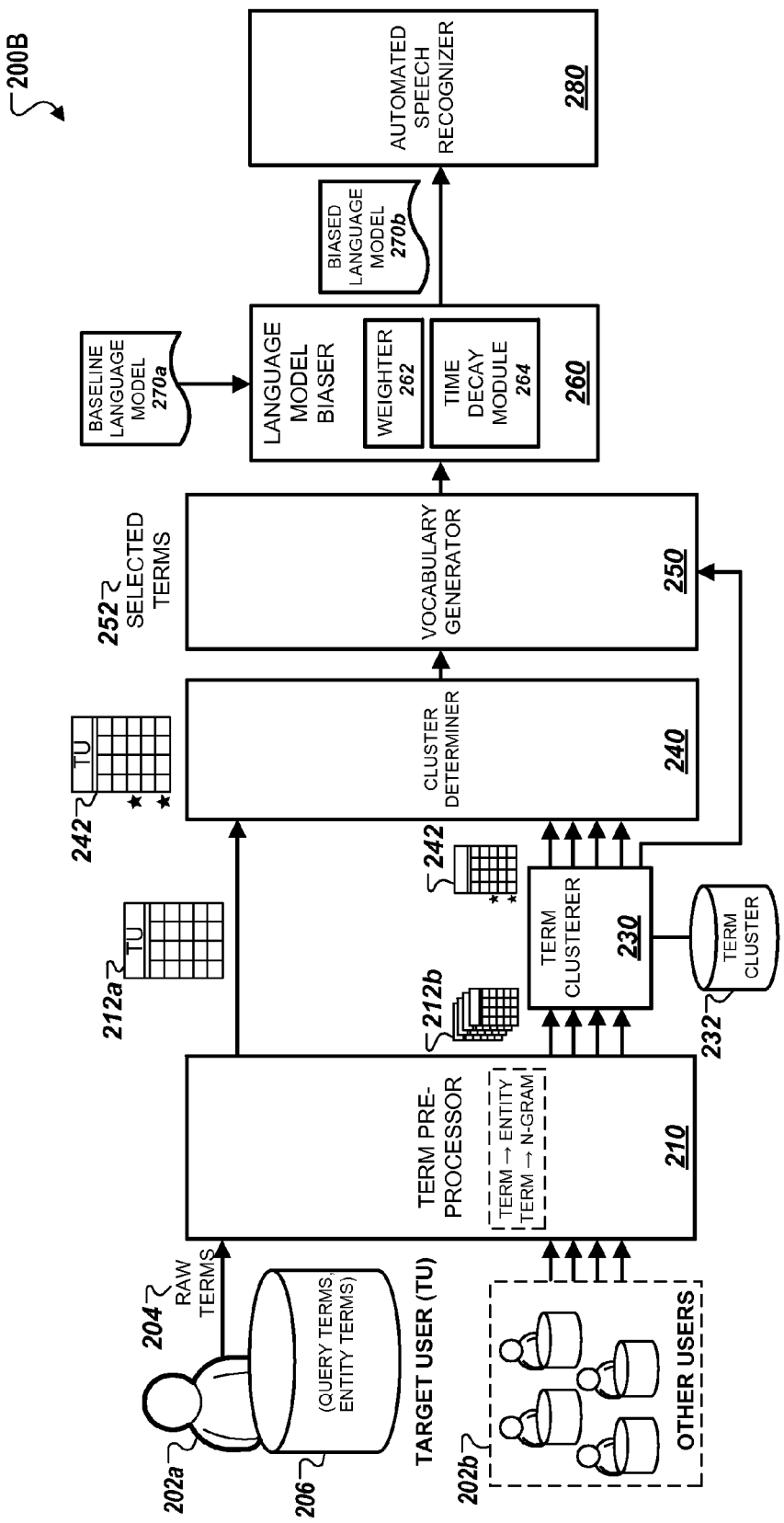

FIGS. 2A-2B illustrate exemplary systems that may be used for collaborative language model biasing. FIG. 2A depicts a system 200B, which uses user similarity to perform collaborative language model biasing. FIG. 2B depicts a system 200, which uses term clustering techniques to perform collaborative language model biasing.

Briefly, the systems 200A and 200B may be used may be used to transcribe raw terms 204 provided by a target user 202a based on comparing terms provided from multiple other users 202b. The systems 200A and 200B may include a term pre-processor 210, a user similarity determiner 220, a term clusterer 230, a cluster determiner 240, a vocabulary generator 250, a language model biaser 260 including a weighter 262 and a time decay module 264, an initial language model 270a, a biased language model 270b, and an automated speech recognizer 280. The systems 200A and 200B also include term vectores 212a, 212b, 222, 212b, and 242, which are described more specifically below.

Generally, the systems 200A and 200B use alternative processes to analyze the term vectors 212a and 212b and selecting particular terms that are outputted to the language model biaser 260 by the vocabulary generator. For example, as shown in FIG. 2A, the term vector 212a and the set of term vectors 212b may be transmitted to the user similarity determiner 220, which selects the particular terms from the term vectors 212a and 212b based on user similarity between the target user 202a and the multiple other users 202b as described in FIG. 1. Alternatively, as shown in FIG. 2B, clustering techniques may be used to select the terms from the term vector 212a and the set of matrices 212b. For instance, the set of term vectors 212b may initially be sent to the term clusterer 230 and then the cluster determiner 240, and the term vector 212a may be sent to the cluster determiner 240.

In some implementations, the systems 200A and 200B may be integrated into a single system that performs collaborative language modeling techniques as described in FIGS. 2A-2B in parallel.

Referring now to FIG. 2A, the term pre-processor 210 may initially receive the raw terms 204, which include a set of terms associated with the target user 202a, and for each of the multiple other users 202b, a set of terms associated with a particular other user. The term pre-processor 210 may initially determine if the received terms are entity names or n-grams. For example, the query terms received from the target user may include "ROGER FEDERER," then the pre-processor may determine that the terms are more likely to be an entity term that represents a tennis player rather than a bi-gram that includes "ROGER" and "FEDERER."

In some implementations, the term determination process may be performed by the term pre-processor 110 based on additional context data received from the target user 202a and the multiple other users 202b. For example, the context data may include user signals, user location, previous search queries, time decay data, or additional data.

The term pre-processor 210 may generate the term vector 212a for the set of terms received from the target user 202a, and the set of term vectors 212b for the set of terms associated with the multiple other users 202b. For example, the term vectors 212a and 212b may include particular terms selected from the set of terms received from the target user 202a and the multiple other users 202b, respectively, and features associated with the particular terms. For example, the features may include a particular recognition score that represents a confidence associated with whether a query that includes the particular term was accurately recognized, a term classification that represents whether a particular term is an entity term or an n-gram, and other extended features related to context data received with the query that includes the particular term. For instance, extended features may include user location, previous locations visited prior to submitting the query, or particular language models of interest. The features included in the term vectors are discussed more particularly in FIG. 3.

The user similarity determiner 220 may receive various inputs based on the different term vector analysis techniques as described previously. For instance, in some implementations, the user similarity determiner 220 receives the term vector 212a associated with the target user 202a and the set of term vectors 212b associated with the multiple other users 202b. In such implementations, the user similarity determiner 220 compares the features included in the term vector 212a and the set of term vectors 212b to identify a particular other user from the multiple other users 202b that is similar to the target user 202a. For instance, as shown in FIG. 1, if the terms associated the particular other user are also shared with the target user 202a, then the user similarity determiner 220 may determine that the two users have a high user similarity.

The user similarity determiner 220 may generate a user term vector 222 that includes terms associated with the target user 202a, the terms associated with each of the multiple other multiple users 202b, and indications for particular other users that the user similarity determiner 220 has determined has a high user similarity with the target user 202a, as represented by the star notations in FIGS. 2A-2B.

In some implementations, the term vector 222 may include a user similarity score that may be calculated based on, for example, the number of common terms between the term vector associated with the user 202a and the particular term vector from the set of term vectors 212b associated with the particular other user of the multiple other users 202b.

The terms associated with the particular other users from the multiple other users 202b that are identified as being similar to the target user by the user similarity determiner 220 are sent to the vocabulary generator 250. In some instances, the user similarity determiner 220 may send the term vector 222, which includes all of the multiple other users 202b, to the vocabulary generator 250. In other instances, the user similarity detector may extract only the terms associated with the particular other users from the multiple other users 202b that are identified as being similar to the target user 202a and send only these terms to the vocabulary generator 250.

In other implementations where the user similarity determiner 220 calculates a user similarity score for each of the multiple other users 202b, the vocabulary generator 250 may only receive terms associated with particular others of the multiple other users 202b that have a user similarity score above a threshold value. For instance, in such implementations, the user similarity sensitivity of the system 200 may be dynamically modulated by adjusting the threshold value required satisfy the user similarity score to send the terms associated with each particular other user from the multiple other users 202b to the vocabulary generator 250.

The vocabulary generator 252 may select one or more terms from the set of terms associated with the each of the particular other users from the multiple other users 202b. For instance, the vocabulary generator 250 may select the terms that have the highest likelihood of being included in a subsequent query sent by the target user 202a based on the features that are also included in the set of term vectors 212b. For example, if the vocabulary generator 250 receives three terms, "DRIBBLE," "JUMPSHOT," and "TOUCHDOWN," which are associated with the particular other user from the multiple other users 202b, the vocabulary generator 250 may select "BASKETBALL" and "JUMPSHOT" and may not select "TOUCHDOWN" based on context data indicating that the target user 202a has submitted a query related to basketball. In another example, the vocabulary generator 250 may not select "TOUCHDOWN" based on a low recognition score associated with the term in the term vector associated with the particular other user of the multiple other users 202b. After selecting the one or more terms associated with the particular other user from the multiple other users 202b, the vocabulary generator 250 may send the selected terms 252 associated with the particular other user from the multiple other users 202b to the language model biaser 260.

The language model biaser 260 may receive the selected terms 252 bias the baseline language model 270a using the selected terms 252 similarly as the language model biaser 140 as described in FIG. 1. For instance, the language model biaser 260 may bias the baseline language model 270a by adjusting probabilities associated with n-grams within the language model that increase the likelihood of being selected to transcribe a subsequent voice query by target user 202a.

The language model biaser 260 includes the weighter 262 and the time decay module 264, which may be used to bias the baseline language model 270a. For instance, the weighter 262 may re-rank predicted n-grams used to generate based on increasing probabilities associated with particular n-grams within the baseline language model 270a that are associated with the selected terms 252. For example, if the selected terms 252 include the terms "DRIBBLE" and "JUMPSHOT," the language model biaser 260 may use the weighter 262 to increase probabilities of n-grams that are associated to basketball.

Additionally, the time decay module 264 may be used to determine how to adjust the probabilities associated with the particular n-grams given user input in response to candidate recognition hypotheses for previous voice queries submitted by the target user 202a. For example, the time decay module 264 may determine, for example, based on a large time interval between a presentation of a candidate recognition hypothesis and a user input in response to a voice query, that the n-grams included in the candidate recognition hypothesis are incorrect transcriptions of the voice query. In other examples, the time decay module 264 may also consider other signals such as whether any action was taken by the target user 202a for a given query or whether the query was refined/corrected in a subsequent query.

The automated speech recognizer 280 may receive the biased language model 270b and uses it to transcribe a subsequent voice query from the target user 202a using an acoustic model. The acoustic model identifies a transcription of the voice query provided by the target user 202a into a readable text. The automatic speech recognizer 280 then uses the biased language model 270b to recognize the transcription by the acoustic model and reduce the word error rate in predicting that the transcription is an accurate representation of the voice query.

Referring now to FIG. 2B, the term pre-processor 210, the vocabulary generator 250, the language model biaser 260, and the automated speech recognizer 280 of the system 200B may perform the substantially same operations as the corresponding components as described in FIG. 2A. Alternatively, the system 200B may include the term clusterer 230, which may receive the set of term vectors 212b. The term clusterer 230 may use a clustering algorithm to generate the term clusters 232. The term clusters 232 may include related terms around common topics and probabilities of the n-grams associated with the terms included in the term clusters for the population of the multiple other users 202b. For example, the term clusterer 230 may build cross-user generalization models for the multiple other users 202b to generate the term clusters 232 for the population of the multiple other users 202b.

One example technique used by the term clusterer 230 to determine the probabilities of the n-grams may include using a non-negative matrix factorization to calculate a low dimensional approximation of n-gram probabilities. For example, the set of term vectors 212b may include a "user×n-gram" matrix, which may then be decomposed into a "user×cluster_probability×n-gram_given_cluster" matrix. The decomposed matrix is a low dimensional approximation of the n-gram probabilities for each of the multiple users 202b. The term clusters 232 generated by the term clusterer 230 may then be sent to the cluster determiner 240. In some implementations, the term clusters 232 may additionally be sent to the vocabulary generator 250.

Other example techniques by the term clusterer 230 to determine the probabilities of the n-grams may include using manually curated clusters, using term co-occurrence data, for example, on the web, or using other standard clustering algorithms, for example, k-means clustering, on columns within the "user×term" matrix.

In some implementations, the term clusters 232 generated by the term clusterer 230 may be additionally include time-dependent parameters that represent the relevance of the terms included in the term clusters 232 to the context associated with the multiple other users 202b. For instance, the time-dependent parameters may include a score that is modulated by the term clusterer 230 based on specific events that impact the voice queries submitted by the multiple other users 202b. For example, particular term clusters 232 that include with soccer and other sports-related terms may have an increased score during the World Cup, which increases the likelihood that the particular term clusters 232 may be selected by the cluster determiner 240 and sent to the user similarity determiner 220. In such an example, the score may be modulated for particular other users from the multiple other users 202b or for particular term clusters 232.

In other implementations, the term clusters 232 may include cluster IDs that are transmitted to the user similarity determiner 220 by the term clusterer 230 to identify particular term clusters 232 that include particular terms included in the term vector 212a associated with the target user 202a. In such implementations, the user similarity determiner 220 may initially determine the particular other users that are associated with the particular term clusters 232 identified by the cluster IDs.

The user similarity determiner 220 may then compare the cluster IDs against one or more cluster identifiers associated with the multiple other users 202b and based on the comparison, identify a particular other user from the multiple other users 202b as being similar to the target user 202a. For instance, if a particular term cluster 232 includes one or more terms that are also included in the term vector 212a associated with the target user 202a, then the user similarity determiner 220 may determine that the target user 220 and a particular other user that is associated with the particular term cluster 232 that includes the one or more terms have a high user similarity.

In some implementations, the user similarity determiner 220 may additionally or alternatively identify a particular other user from the multiple other users 202b as being similar to the target user 202a based on the terms that the particular other user has used within particular term clusters 232. For example, if the target user 202a is interested in tennis and art, and the particular other user is interested in tennis and cooking, then the terms from the term clusters 232 for tennis for each user may be compared to determine if the tennis-related terms between the two users are highly similar. In such an example, the terms included in the particular term cluster 232 associated with the particular other user that corresponds to tennis may be included in the selected terms 252 to transcribe a subsequent query by the target user 202a. In another example, if a second particular other user is interested in art, then the terms from the particular term cluster 232 associated with the second particular other user that corresponds to art may be included in the selected terms 252. In both examples, cluster pairs corresponding to shared topics (e.g., tennis and art) may be used to perform collaborative language model biasing.

In other implementations, the user similarity determiner 220 may additionally or alternatively compare the terms included in the term clusters 232. For instance, if the term clusters 232 are large, the user similarity determiner 220 may determine user similarity on a per-cluster basis, for example, by considering whether the target user 202a and a particular other user have similar interests within particular subjects within the term clusters 232.

The cluster determiner 240 may select a particular term from the set of terms included in the term vector 212a that are associated with the target user 202a. For instance, the cluster determiner 240 may recursively select each term in the term vector 212a based on the confidence score associated each particular term, e.g., from high confidence to low confidence. The cluster determiner 240 may also identify a particular term cluster 232 associated with the multiple other users 202b that includes the particular term and includes one or more terms that are associated with the multiple other users 202b. For example, if the particular term that is associated with the target user 202a is "football," the cluster determiner 240 may identify particular term clusters associated with sports that include the term "football." The particular term clusters may also include related terms such as "goal," "referee," and "score," which are terms associated with the multiple other users 202b but are not included in the term vector 21a associated with the target user 202a.

In some instances, the cluster determiner 240 may additionally or alternatively select multiple terms from the set of terms included in the term vector 212a that are associated with the target user 202a.

The cluster determiner 240 may generate the term vector 242 that includes the particular terms that are included in the identified term clusters 232 and other terms that are not included in the term clusters 232. For instance, if a particular term that is associated with the target user 202a is included in one of the term clusters 232, then the term vector 242 may include a corresponding indication, as represented by the star notations in FIG. 2B. In another instance, if another particular term that is associated with the target user 202a is not included in one of the term clusters 232, then the term vector 242 does not include a corresponding indication. In each of these instances, the term vector 242 may be used to represent all the terms included in the term vector 212a and identify the particular terms that are also included in the term clusters 232, which increases the probability that these terms will likely be included in subsequent voice queries submitted by the target user 202a.

The cluster determiner 240 may then transmit the cluster IDs that are associated with the identified term clusters that include particular terms associated with the target user 202a to the user similarity determiner 220. In some implementations, the cluster determiner 240 may additionally or alternatively send the term vector 242, which enables the user similarity determiner 220 to determine user similarity between the target user 202a and the multiple other users 212b based on particular terms included in the term vector 242 that are also included in the term clusters 232.

FIG. 3 illustrates an exemplary term vector 300 used for collaborative language model biasing. In some implementations, the term vector 300 corresponds to the term vector 212a as represented in FIGS. 2A-2B. The term vector 300 may include fields such as term, recognition score, and classification.

The term field may include a set of terms that are associated with the target user 202a that are extracted from the term repository 206. As represented in FIG. 3, the term field includes example bigrams "ABRAHAM ABRAHAM," "ROGER FEDERAL," "ROGER FEDERER," and "ZZYZX ZZYZX," which are ordered in alphabetical order. As shown, "ABRAHAM ABRAHAM" and "ZZYZ ZZYZX" may be included in the term vector 300 although the target user not have previously said these bigrams in a previous voice query. The terms may include terms that the ASR has recognized as n-grams, for example, "ROGER FEDERAL" that include the unigrams "ROGER" and "FEDERAL" and entity terms, for example, "ROGER FEDERER" associated with the tennis athlete. Additionally, the terms may also alternative forms of a single term such as, for example, the entity and n-gram forms of "ROGER FEDERER."

The recognition score field includes recognition scores for each term that indicate the number of instances where each particular term included in the term vector 300 was a correct and incorrect transcription for an utterance of a previous voice query. As shown in FIG. 3, the recognition scores for terms "ABRAHAM ABRAHAM" and "ZZYZX ZZYZX" includes zero instances where they were correct and incorrect transcriptions because they were not included in previous utterances by the target user. However, recognition score for the term "ROGER FEDERAL" indicates that the term was incorrectly recognized twenty seven times because the ASR incorrectly transcribed the utterance "RA-JE-ER FE-DE-RU" as shown in FIG. 1. Finally, the recognition scores for the alternative forms of the term "ROGER FEDERER" indicate that although both forms were correctly transcribed by the user, the entity form of the term was more frequently used by the target user, and therefore, represents a stronger recognition score. For example, the entity form may be more frequently associated with the target user because the target user may have provided more open-ended voice queries that reference the entity term rather than the n-gram term such as, "who is the most winningest tennis player," which describes the tennis player Roger Federer.

The classification field indicates whether the term pre-processor 210 classifies the term as an n-gram or an entity term. For instance, the pre-processor 210 may use context data associated with the target user 202a to determine whether the term represents an entity term based on the user location, user preferences, and/or other context data that may be received with prior voice queries. For example, as represented in FIG. 3, the term vector 300 may include n-gram and entity terms associated with the single term "ROGER FEDERER."

Figure 4:
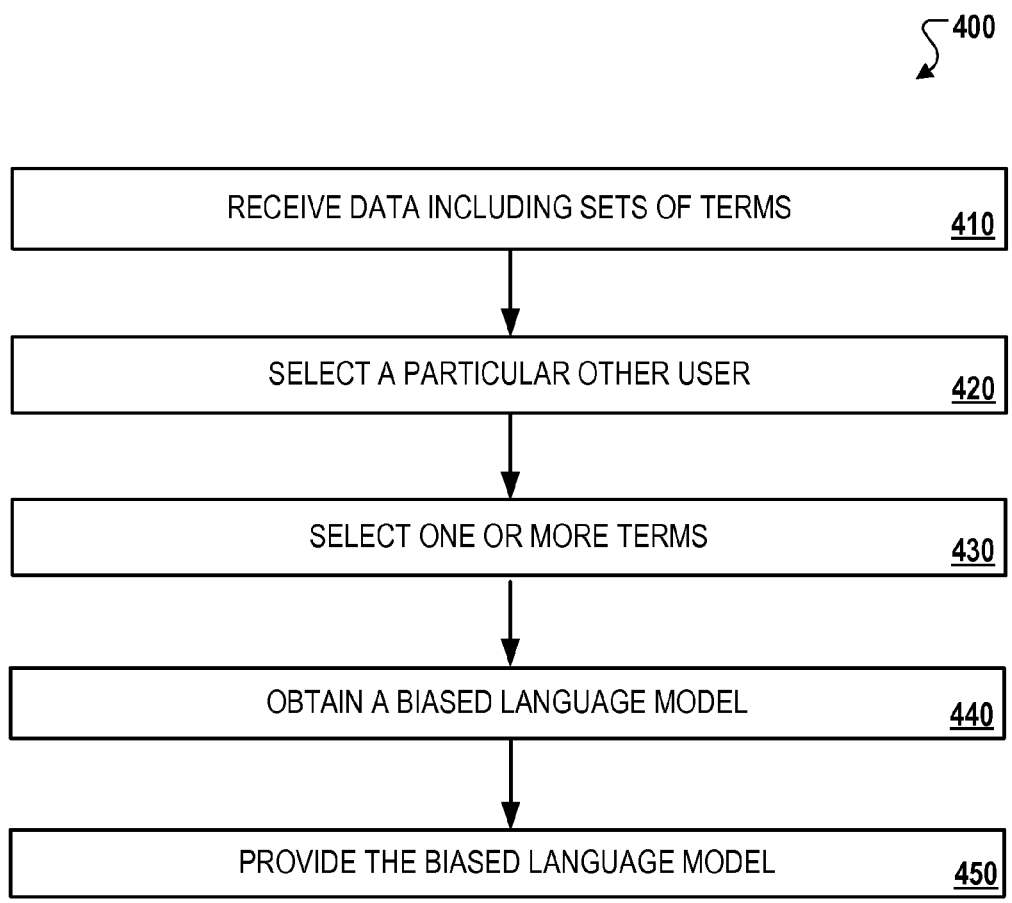
FIG. 4 illustrates an exemplary process for collaborative language model biasing.

FIG. 4 illustrates an exemplary process 400 for collaborative language model biasing. Briefly, the process 400 may include receiving data including sets of terms (410), selecting a particular other user (420), selecting one or more terms (430), obtaining a biased language model (440), and providing the biased language model (450).

In more detail, the process 400 may include receiving data including sets of terms (410). For example, the term pre-processor 210 may receive data including a set of terms associated with the target user 202a, and, from each of the multiple other users 202b, data including a set of terms associated with the particular other user 202b. The set of terms associated with the target user 202a and the multiple other users 202b may include terms included in previous voice queries, search queries, n-grams included in prior recognition transcriptions, and systems other than ASR that use language models. In some instances, the set of terms associated with the target user 202a may be extracted from non-speech n-grams. For example, such n-grams may be extracted from web searches, online documents, previously read news articles, and other types of electronic content utilized by the target user 202a. In other instances, non-speech systems such as machine translation systems, digital keyboards, or handwriting recognition systems may also be used to generate the set of terms associated with the target user 202a.

The set of terms associated with the target user 202a and the multiple other users 202b may include n-grams and entity terms that include names of local points of interest such as restaurants, or names of individuals associated with particular events such as celebrities or athletes. In instances, where the terms associated with the target user 202a and the multiple other users 202b include entity terms, the term pre-processor may use received context data associated with the target user 202a and the multiple other users 202b, such as user location, application tracking behavior, and search history, to recognize the entity terms and distinguish them from n-grams.

The process 400 may include selecting a particular other user (420). For example, the user similarity determiner 210 may select a particular other user from the multiple other users 202b based on comparing the sets of terms associated with the target user 202a to the sets of terms associated with the multiple other users 202b. For instance, the particular other user may be identified by the term pre-processor 210 as being similar to the target user. To determine user similarity, the user similarity determiner 220 may initially compare the set of terms included in the term vector 212a associated with the target user 202a and the set of terms included in the set of matrices 212b associated with the multiple other users 202b in order to identify common terms that are associated with the target user 202a and the particular other user from the multiple other users 202b. After identifying the common terms, the user similarity determiner 210 may select the particular other user from the multiple other users 202b that are associated with each the common terms and determine that the particular other users are similar to the target user 202a.

The process 400 may include selecting one or more terms (430). For example, the vocabulary generator 250 may select one or more terms from the set of terms that is associated with the particular other user from the multiple other users 202b. The vocabulary generator 250 may initially receive a set of terms associated with the particular other user from the multiple other users 202b that have been identified as being similar to the target user 202a. The vocabulary generator 250 may then select one or more terms from the received set of terms based on determining which particular terms are more likely to be included in a subsequent query by the target user 202a.

In some instances, the vocabulary generator 250 may initially select the one or more terms based on the recognition scores associated with each term included in the received set of terms. For instance, as discussed in FIGS. 2A-2B, the vocabulary generator 250 may use a threshold recognition score to determine which particular terms to select. In other instances, the vocabulary generator 250 may select terms based on context data associated with the target user 202a. For instance, if the context data indicates that the user in currently in a particular location, then the particular terms that are selected may be entity terms that represent points of interests nearby the current location of the target user 202a.

The process 400 may include obtaining a biased language model (440). For example, the language model biaser 260 may generate the biased language model 270b using the selected terms that are associated with the particular other user. The language model biaser 260 may initially receive the selected terms 252 from the vocabulary generator 250, which includes terms that are both associated with the target user and particular other users from the multiple other users 202b that are identified as being similar to the target user 202a.

In some instances, the language model biaser 260 may additionally receive a score associated each of the selected terms 252 that represents the likelihood that the particular selected term will be included in a subsequent query by the target user 202a. For instance, as described previously, the score may be based on the current context of the target user 202a or the degree of similarity between the target user 202a and the particular other user that is associated with the particular selected term.

The language model biaser 260 may use the selected terms 252 to adjust the probabilities of n-grams in the baseline language model 270a that are associated with particular selected terms 252. In some instances, the selected terms 252 may be used by the language model biaser 260 prior to speech recognition. For example, the language model biaser 260 may positively bias the baseline language model 270a by increasing the probabilities of particular n-grams associated with the particular selected terms 252 such that the likelihood that the particular n-grams are included in a candidate recognition hypothesis by the automated speech recognizer 280 for a subsequent voice query by the target user 202a. In other instances, the selected terms 252 may be used after recognition of a subsequent voice query by the target user 202a. For example, the language model biaser may use the selected terms 252 to re-rank candidate recognition hypotheses based on determining which of the particular recognition hypotheses includes the greatest number of selected terms 252.

The process 400 may include providing the biased language model (450). For example, the language model biaser 260 may provide the biased language model 270b to the automated speech recognizer 280. The biased language model 270b includes modulated probabilities for particular n-grams that are associated with the selected terms 252 based on a similarity between the target user 202a and a particular other user from the multiple other users 202b.

FIG. 5 is a block diagram of computing devices 500, 550 that may be used to implement the systems and methods described in this specification, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth intensive operations. Such allocation of functions is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet may be coupled to one or more input/output devices, such as a keyboard, a pointing device, microphone/speaker pair, a scanner, or a networking device such as a switch or router, e.g., through a network adapter. The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, and an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 510 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc. and may also include sound generated by applications operating on device 550.

The computing device 550 may be implemented in a number of different forms, as shown in the figure. For example, it may be implemented as a cellular telephone 480. It may also be implemented as part of a smartphone 582, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
receiving, by a term pre-processor module of a server-based automated speech recognition system that includes (a) the term pre-processor module, (b) a user similarity determiner module, (c) a vocabulary generator module, (d) a language model biaser module, and (e) an automated speech recognizer, and from a device associated with a target user, (i) data including a set of terms associated with the target user that includes terms from one or more queries previously submitted by the target user, and, (ii) from each of multiple other users, data including a set of terms associated with the other user;
selecting, by the user similarity determiner module of the server-based automated speech recognition system, a particular other user based at least on comparing the set of terms associated with the target user to the sets of terms associated with the other users;
selecting, by the vocabulary generator module of the server-based automated speech recognition system, one or more terms from the set of terms that is associated with the particular other user;
obtaining, by the language model biaser module of the server-based automated speech recognition system and based on the selected terms that are associated with the particular other user, a biased language model;
using, by the automated speech recognizer of the server-based automated speech recognition system, the biased language model generate a speech recognition output; and
providing, by the server-based automated speech recognition system, the speech recognition output to the device associated with the target user.

2. The method of claim 1, wherein selecting a particular other user based at least on comparing the set of terms associated with the target user to the sets of terms associated with the other users comprises selecting multiple particular other users based at least on comparing the set of terms associated with the target user to the sets of terms associated with the multiple other particular users.

3. The method of claim 1, wherein the particular other user is a user that is identified as similar to the target user.

4. The method of claim 1, wherein obtaining the biased language model comprises adjusting a respective score associated with each of the selected terms in a baseline language model.

5. The method of claim 1, wherein, for each user, the set of terms associated with the user includes terms that are indicated as terms that have been accepted by the user.

6. The method of claim 1, wherein, for each term of the set of terms, the data indicates whether the term comprises an n-gram or an entity name.

7. The method of claim 1, wherein the set of terms associated with a target user includes transcriptions of prior utterances by the target user.

8. The method of claim 7, comprising:
receiving an utterance from the target user; and
transcribing the utterance using the biased language model.

9. The method of claim 1, further comprising:
receiving, from the device associated with the target user, a subsequent query of the target user;
using, by the automated speech recognizer, the biased language model to generate an output responsive to the subsequent query of the target user; and
providing the output to the device associated with the target user.

10. A computer-implemented method comprising:
receiving, by a term pre-processor module of a server-based automated speech recognition system that includes (a) the term pre-processor module, (b) a vocabulary generator module, (c) a language model biaser module, and (d) an automated speech recognizer, and from a device associated with a target user, (i) data including a set of terms associated with the target user that includes terms from one or more queries previously submitted by the target user, and, (ii) from each of multiple other users, data including a set of terms associated with the other user;
selecting, by the vocabulary generator module of the server-based automated speech recognition system, a particular term from the set of terms associated with the target user;
identifying, by the vocabulary generator module of the server-based automated speech recognition system, a particular other term, from among the sets of terms that are associated with the multiple other users, that is indicated as related to the particular term;
obtaining, by the language model biaser module of the server-based automated speech recognition system and based on the particular other term, from among the sets of terms that are associated with the multiple other users, that is indicated as related to the particular term, a biased language model;
using, by the automated speech recognizer of the server-based automated speech recognition system, the biased language model generate a speech recognition output; and
providing, by the server-based automated speech recognition system, the speech recognition output to the device associated with the target user.

11. The method of claim 10, wherein, for each user, the set of terms associated with the user includes terms that are indicated as terms that have been accepted by the user.

12. The method of claim 10, wherein, for each term of the set of terms, the data indicates whether the term comprises an n-gram or an entity name.

13. The method of claim 10, wherein identifying the particular other term that is indicated as related to the particular term comprises:
identifying an identifier of a cluster of related terms that (i) includes the particular term from the set of terms that are associated with the target user, and (ii) includes one or more terms that are associated with the multiple other users; and
identifying, based at least on comparing the identifier of the cluster of related terms to one or more cluster identifiers associated with the multiple other users, a particular other term that is indicated as related to the particular term.

14. The method of claim 10, wherein selecting a particular term from the set of terms associated with the target user comprises selecting multiple particular terms from the set of terms associated with the target user.

15. The method of claim 14, wherein identifying the particular other term that is indicated as related to the particular term comprises identifying the particular other term that is indicated as related to the multiple particular terms.

16. A computer-implemented method comprising:
receiving, by a term pre-processor module of a server-based automated speech recognition system that includes (a) the term pre-processor module, (b) a cluster determiner module, (c) a user similarity determiner module, (d) a vocabulary generator module, (e) a language model biaser module, and (f) an automated speech recognizer, and from a device associated with a target user, (i) data including a set of terms associated with the target user that includes terms from one or more queries previously submitted by the target user, and, (ii) from each of multiple other users, data including a set of terms associated with the other user;
selecting, by the cluster determiner module of the server-based automated speech recognition system, a particular term from the set of terms associated with the target user;
identifying, by the cluster determiner module of the server-based automated speech recognition system, an identifier of a cluster of related terms that (i) includes the particular term from the set of terms that are associated with the target user, and (ii) includes one or more terms that are associated with the multiple other users;
selecting, by the user similarity determined module of the server-based automated speech recognition system, a particular other user based at least on comparing the identifier of the cluster of related terms to one or more cluster identifiers associated with the multiple other users;
selecting, by the vocabulary generator module of the server-based automated speech recognition system, one or more terms from the set terms that is associated with the particular other user;
obtaining, by the language biaser module of the server-based automated speech recognition system and based on the selected terms that are associated with the particular other user, a biased language model; and
using, by the automated speech recognizer of the server-based automated speech recognition system, the biased language model generate a speech recognition output; and
providing, by the server-based automated speech recognition system, the speech recognition output to the device associated with the target user.

17. The method claim 16, wherein the set of terms that is associated with the particular other user is part of the cluster of related terms that (i) includes the particular term from the set of terms that are associated with the target user, and (ii) includes one or more terms that are associated with the multiple particular other users.

18. The method of claim 16, wherein selecting one or more terms from the set terms that is associated with the particular other user comprises selecting one or more terms, from among the set of terms that is associated with the particular other user, that are identified as being rejected by the particular other user.

19. The method of claim 18, wherein obtaining the biased language model comprises obtaining, based on the selected terms that are identified as being rejected by the particular other user, a biased language model that is biased away from the selected terms that are identified as being rejected by the particular other user.

* * * * *